(12) United States Patent
Gormley

(10) Patent No.: US 9,784,214 B2
(45) Date of Patent: Oct. 10, 2017

(54) THRUST REVERSER WITH HIDDEN LINKAGE BLOCKER DOORS

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 50 days.

(21) Appl. No.: 14/535,015

(22) Filed: Nov. 6, 2014

(65) Prior Publication Data
US 2016/0131082 A1 May 12, 2016

(51) Int. Cl.
| F02C 1/00 | (2006.01) |
| F02K 1/76 | (2006.01) |
| F02K 1/62 | (2006.01) |
| F02K 1/72 | (2006.01) |

(52) U.S. Cl.
CPC ............ *F02K 1/766* (2013.01); *F02K 1/625* (2013.01); *F02K 1/72* (2013.01); *F02K 1/763* (2013.01); *F05D 2250/313* (2013.01); *F05D 2260/50* (2013.01); *F05D 2260/532* (2013.01)

(58) Field of Classification Search
CPC ..... F02K 1/64; F02K 1/74; F02K 1/76; F02K 1/56; F02K 1/763
See application file for complete search history.

(56) References Cited

U.S. PATENT DOCUMENTS

| 2,943,443 | A | | 7/1960 | Voymas | |
| 3,024,605 | A | | 3/1962 | Nash | |
| 3,497,165 | A | * | 2/1970 | Bee | F02K 1/72 |
| | | | | | 239/265.29 |
| 3,500,646 | A | | 3/1970 | Horn et al. | |
| 3,587,973 | A | * | 6/1971 | wolf | B65D 5/18 |
| | | | | | 181/215 |
| 3,600,894 | A | * | 8/1971 | McClain | F02K 1/72 |
| | | | | | 60/226.1 |
| 3,612,209 | A | * | 10/1971 | Vdoviak | F02K 1/1269 |
| | | | | | 181/211 |

(Continued)

FOREIGN PATENT DOCUMENTS

| DE | 102011008918 | 7/2012 |
| EP | 0926333 | 6/1999 |
| WO | 2011073558 | 6/2011 |

OTHER PUBLICATIONS

Mohd Siddiqui, "Review of Thrust Reverser Mechanism Used in Turbofan Jet Engine Aircraft", International Journal of Engineering Research and Technology, ISSN 0974-3154 vol. 6, No. 5, International Research Publication House, 2013, pp. 717-726.

(Continued)

*Primary Examiner* — Gerald L Sung
(74) *Attorney, Agent, or Firm* — O'Shea Getz P.C.

(57) ABSTRACT

Aspects are directed to a system that includes an outer structure of a thrust reverser, a blocker door, and a plurality of four-bar mechanisms arranged in series with one another that couple the outer structure and the blocker door. Aspects are directed to a system for a thrust reverser of an aircraft that includes a blocker door, a kinematic mechanism configured to actuate the blocker door, and a pressure shelf, where the blocker door is configured to reside below the pressure shelf in proximity to a duct of the thrust reverser, and where at least a portion of the kinematic mechanism is configured to reside above the pressure shelf.

15 Claims, 10 Drawing Sheets

(56) References Cited

U.S. PATENT DOCUMENTS

| | | | |
|---|---|---|---|
| 4,564,160 A | 1/1986 | Vermilye | |
| 4,567,786 A | 2/1986 | Sakurai | |
| 5,117,630 A | 6/1992 | Cariola | |
| 5,255,850 A * | 10/1993 | Cockerham | F02K 1/62 239/265.19 |
| 5,309,711 A * | 5/1994 | Matthias | F02K 1/72 239/265.29 |
| 5,476,237 A | 12/1995 | Clarke | |
| 5,609,020 A | 3/1997 | Jackson | |
| 5,778,659 A | 7/1998 | Duesler et al. | |
| 5,937,636 A * | 8/1999 | Gonidec | F02K 1/70 239/265.31 |
| 5,987,880 A * | 11/1999 | Culbertson | F02K 1/70 239/265.37 |
| 6,042,053 A | 3/2000 | Sternberger | |
| 6,293,495 B1 | 9/2001 | Aten | |
| 6,311,928 B1 * | 11/2001 | Presz, Jr. | B64D 33/04 239/265.29 |
| 6,487,846 B1 * | 12/2002 | Chakkera | F02K 1/766 239/265.27 |
| 6,584,763 B2 | 7/2003 | Lymons | |
| 7,104,500 B1 | 9/2006 | Smith | |
| 7,735,778 B2 | 6/2010 | Lair | |
| 7,874,142 B2 | 1/2011 | Beardsley | |
| 8,002,217 B2 | 8/2011 | Sternberger | |
| 8,109,468 B2 | 2/2012 | Andre et al. | |
| 8,172,175 B2 | 5/2012 | Lair | |
| 8,793,973 B2 | 8/2014 | Vauchel | |
| 8,904,751 B2 | 12/2014 | Howarth et al. | |
| 9,181,898 B2 | 11/2015 | Bhatt | |
| 2004/0068978 A1 * | 4/2004 | Lair | F02K 1/70 60/226.2 |
| 2005/0039438 A1 * | 2/2005 | Lair | F02K 1/763 60/226.2 |
| 2005/0151012 A1 * | 7/2005 | Lair | F02K 1/70 244/110 B |
| 2006/0288688 A1 * | 12/2006 | Lair | F02K 1/386 60/226.2 |
| 2009/0193789 A1 * | 8/2009 | Pero | F02K 1/70 60/226.2 |
| 2009/0321561 A1 | 12/2009 | Andre et al. | |
| 2010/0139242 A1 | 6/2010 | Vauchel et al. | |
| 2012/0193448 A1 | 8/2012 | Caruel | |
| 2012/0304621 A1 | 12/2012 | Stuart | |
| 2014/0150403 A1 * | 6/2014 | Stuart | F02K 1/72 60/204 |
| 2015/0267640 A1 | 9/2015 | Gormley | |
| 2015/0308380 A1 | 10/2015 | Biset | |

OTHER PUBLICATIONS

EP search report for EP15193214.2 dated Mar. 7, 2016.

* cited by examiner

THRUST REVERSER WITH HIDDEN LINKAGE BLOCKER DOORS

BACKGROUND

Within a turbofan engine that utilizes a cascade type thrust reverser, there are typically a plurality of blocker doors that deploy in order to redirect engine bypass air thru a set of cascades that turn the airflow out and forward in order to reverse the direction of the thrust of the engine. This may be done to slow an aircraft after landing. Referring to FIG. 1A, a system 100 is shown. The system 100 includes a sleeve 102 that is translated or moved in, e.g., an aft direction in order to expose cascades 104 as part of the deployment of the thrust reverser. Similarly, in order to place the thrust reverser in a stowed state (e.g., during flight) the sleeve 102 is translated or moved in, e.g., a forward (FWD) direction, such that the sleeve 102 may contact or abut a thrust reverser fixed structure 106. When in the stowed state, the cascades 104 are not exposed. FIG. 5 illustrates the system 100 in the stowed state. An entirety of a nacelle is shown in FIG. 5, whereas a portion (e.g., a half) of the nacelle is shown in FIG. 1A.

The blocker doors described above are typically pivotally attached to the sleeve 102 within the thrust reverser. FIG. 1B illustrates a blocker door 108 of the system 100 hinged to the sleeve 102 near a point 110. Additionally, the door 108 is attached to the inner fixed structure 114 of the thrust reverser via a drag link 112 that retains the door 108 in position during normal flight as well as aids in the deployment of the door 108 during thrust reverse mode.

The drag link 112 lies within the flow of bypass air from the engine's fan and generates drag losses, resulting in degraded efficiencies.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a fixed structure of a thrust reverser, a blocker door, and a plurality of mechanisms arranged in series with one another to couple the fixed structure and the blocker door, including at least a first crank that pivots in a first plane and a second crank that pivots in a second plane normal to the first plane. In some embodiments, the plurality of mechanisms comprises a first four-bar mechanism, the first four-bar mechanism comprising: the fixed structure, a first pushrod coupled to the fixed structure, a first crank coupled to the first pushrod, and a sleeve coupled to the first crank, wherein the first crank is pivotally attached to the sleeve. In some embodiments, the system further comprises at least one cascade configured to be selectively hidden or exposed based on a degree to which the sleeve is translated. In some embodiments, the plurality of mechanisms comprises a second four-bar mechanism, the second four-bar mechanism comprising: the first crank, the sleeve, a second pushrod coupled to the first crank, and a second crank coupled to the second pushrod. In some embodiments, the system is configured to convert a tangential motion associated with the first crank to a radial motion associated with the second crank. In some embodiments, the plurality of four-bar mechanisms comprises a third four-bar mechanism, the third four-bar mechanism comprising: the sleeve, the second crank, a third pushrod coupled to the second crank, and the blocker door coupled to the third pushrod. In some embodiments, the system further comprises a pressure shelf, wherein at least a portion of the third pushrod is configured to selectively penetrate the pressure shelf based on whether the thrust reverser is operated in a stowed state or a deployed state. In some embodiments, the system further comprises a seal configured to maintain a differential pressure between a duct associated with the sleeve and an ambient environment located external to the duct.

Aspects of the disclosure are directed to a system for a thrust reverser of an aircraft comprising: a blocker door, a kinematic mechanism configured to actuate the blocker door, and a pressure shelf, wherein the blocker door is configured to reside below the pressure shelf in proximity to a duct of the thrust reverser, and wherein at least a portion of the kinematic mechanism is configured to reside above the pressure shelf. In some embodiments, the blocker door is configured to be deployed in a substantially radial direction towards a center of the system, and wherein the kinematic mechanism is configured to convert a substantially tangential motion associated with the actuation to a substantially radial motion associated with the deployment. In some embodiments, the system further comprises a seal associated with the pressure shelf is configured to seal around a penetration formed through the pressure shelf through which a portion of the kinematic mechanism is positioned, the seal maintaining a differential pressure between the duct and an ambient environment located external to the duct. In some embodiments, the kinematic mechanism comprises a gearbox, and wherein the gearbox comprises bevel gears. In some embodiments, the kinematic mechanism comprises a plurality of four-bar mechanisms arranged in series. In some embodiments, the plurality of four-bar mechanisms comprise: a first four-bar mechanism comprising: an outer structure of the thrust reverser, a first pushrod coupled to the outer structure of the thrust reverser, a first crank coupled to the first pushrod, and a sleeve coupled to the first crank, a second four-bar mechanism comprising: the first crank, the sleeve, a second pushrod coupled to the first crank, and a second crank coupled to the second pushrod, a third four-bar mechanism comprising: the sleeve, the second crank, a third pushrod coupled to the second crank, and the blocker door coupled to the third pushrod. In some embodiments, the first crank is pivotally attached to the sleeve, and the system further comprises at least one cascade configured to be selectively hidden or exposed based on a degree to which the first crank is pivoted or the sleeve is translated. In some embodiments, the kinematic mechanism is configured to convert a substantially tangential motion into a substantially radial motion.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
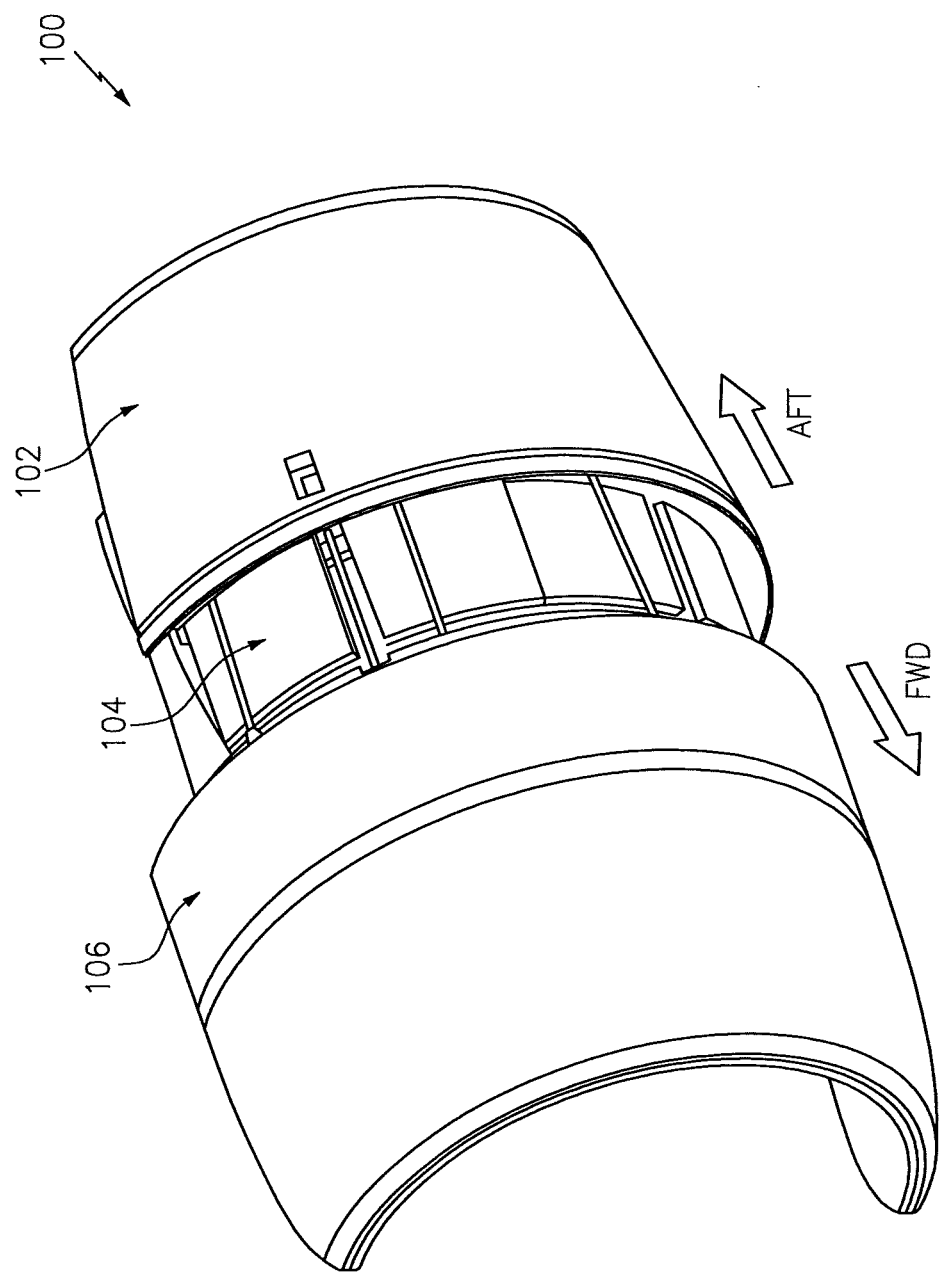
FIG. 1A schematically illustrates a thrust reverser system incorporating a translating sleeve in accordance with the prior art.
Figure 1B:
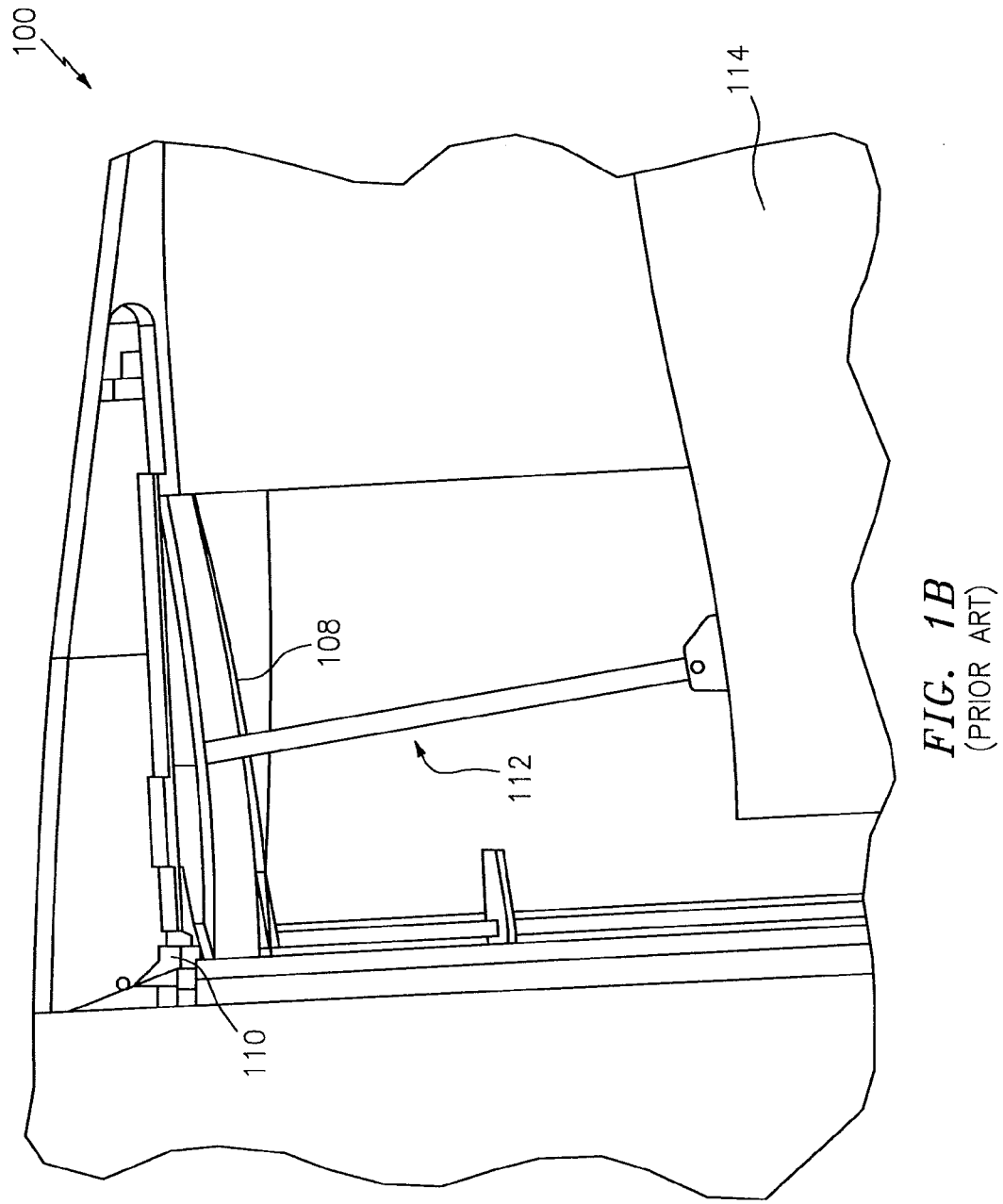
FIG. 1B schematically illustrates a drag link of the system of FIG. 1A in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a thrust reverser. In accordance with aspects of the disclosure, the drag links normally positioned inside the fan duct in a conventional thrust reverser design are eliminated in order to reduce drag. Rather, the linkages for driving the motion of the blocker doors are positioned inside of the translating sleeve Referring to FIG. 2, a thrust reverser system 200 is shown. The system 200 includes a first pushrod 222. The first pushrod 222 may couple to an outer fixed structure 206 of the thrust reverser. The structure 206 may constitute, for example, a torque tube positioned at the forward end of the thrust reverser. The first pushrod 222 may couple to a first crank 224. The first crank 224 may pivotally attach to a sleeve 202. The first pushrod 222 and the first crank 224 may generally be positioned in and/or their motion may be generally constrained in a first plane that is generally tangential to the sleeve 202 and the central axis of the thrust reverser system and the engine.

The first crank 224 may couple to a second pushrod 226. The second pushrod 226 may couple to a second crank 228.

The second crank 228 may couple to a third pushrod 230. One or both of the second crank 228 and the third pushrod 230 may penetrate through a pressure shell/shelf 240 as further described below.

The third pushrod 230 may couple to a blocker door 208. The blocker door 208 may be similar to the blocker door 108 of the system 100, except that its actuation and motion and connection points are different.

The system 200 may incorporate a plurality of four-bar mechanisms. A first four-bar mechanism may include the first crank 224, the first pushrod 222, the structure 206, and the sleeve 202. A second four-bar mechanism may include the second crank 228, the second pushrod 226, the first crank 224, and the sleeve 202. A third four-bar mechanism may include the door 208, the third pushrod 230, the second crank 228 and the sleeve 202. In the system 200, these four-bar mechanisms that act to actuate the blocker doors are arranged in series with one another.

Depending on a state of one or more of the components/devices described above in connection with the system 200, cascades 204 may be selectively exposed (during thrust reversal deployment) or hidden (when the thrust reverser is in a stowed state). The cascades 204 may be similar to the cascades 104 of the system 100.

Figure 2:
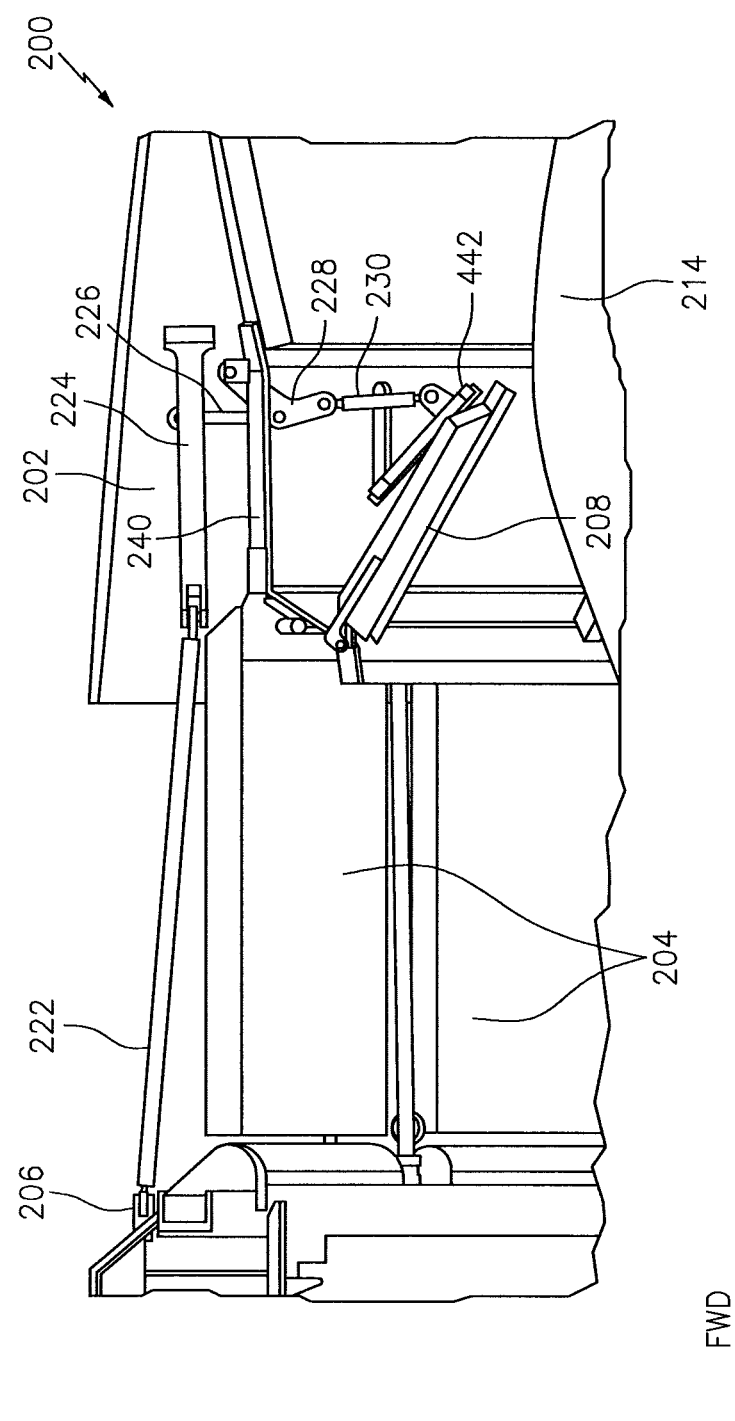
FIG. 2 illustrates a thrust reverser system in accordance with aspects of the disclosure.

The door 208 is shown in FIG. 2 in a substantially deployed state, such that the door 208 is proximate to an inner fixed structure 214. The inner fixed structure 214 may be similar to the inner fixed structure 114 of the system 100.

Figure 3A:
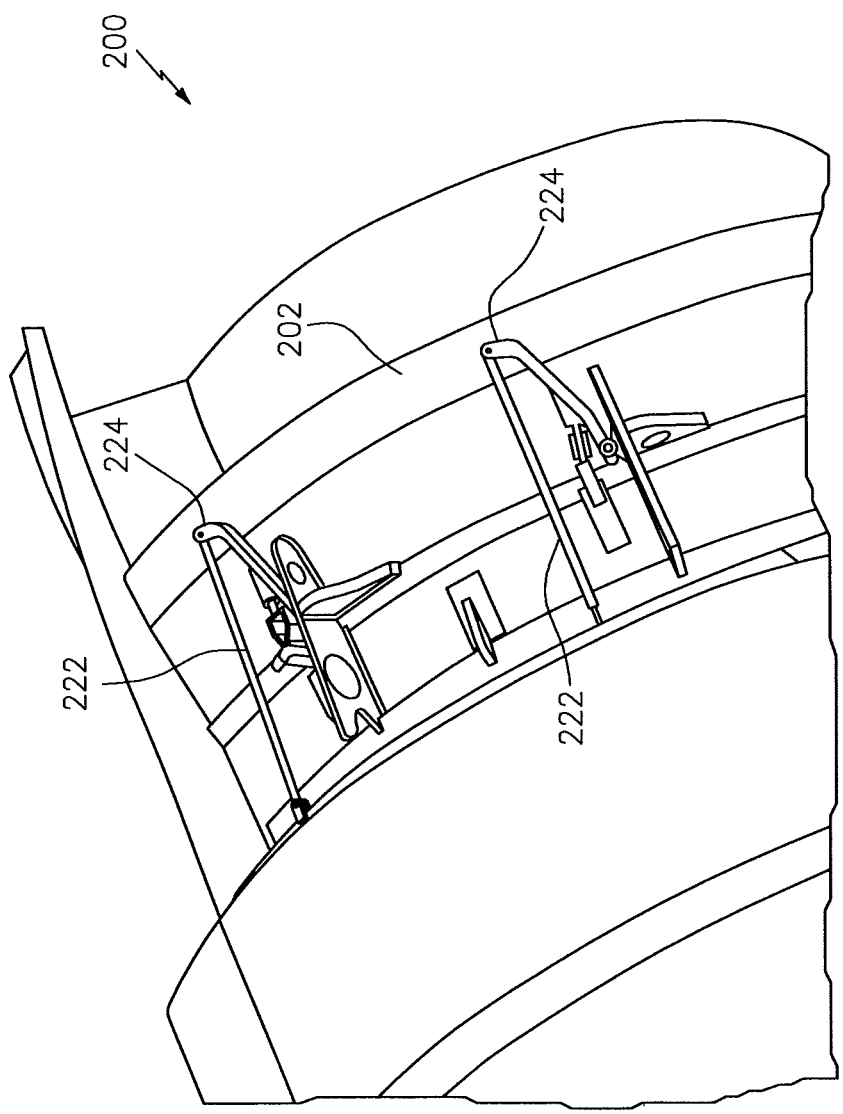
FIGS. 3A-3C illustrate the system of FIG. 2, and in particular, various states/positions of first cranks based on a pivoting of the first cranks in relation to an exposure of cascades.

Referring now to FIG. 3A, another view of the system 200 is shown, wherein two sets of mechanisms for actuating blocker doors are visible (there may be one mechanism per blocker door, and each half may have several blocker doors radially arranged around the bypass air duct. In FIG. 3A, the first cranks 224 are pivotally attached to the sleeve 202, wherein the sleeve 202 is shown with its outer skin removed.

Figure 3B:
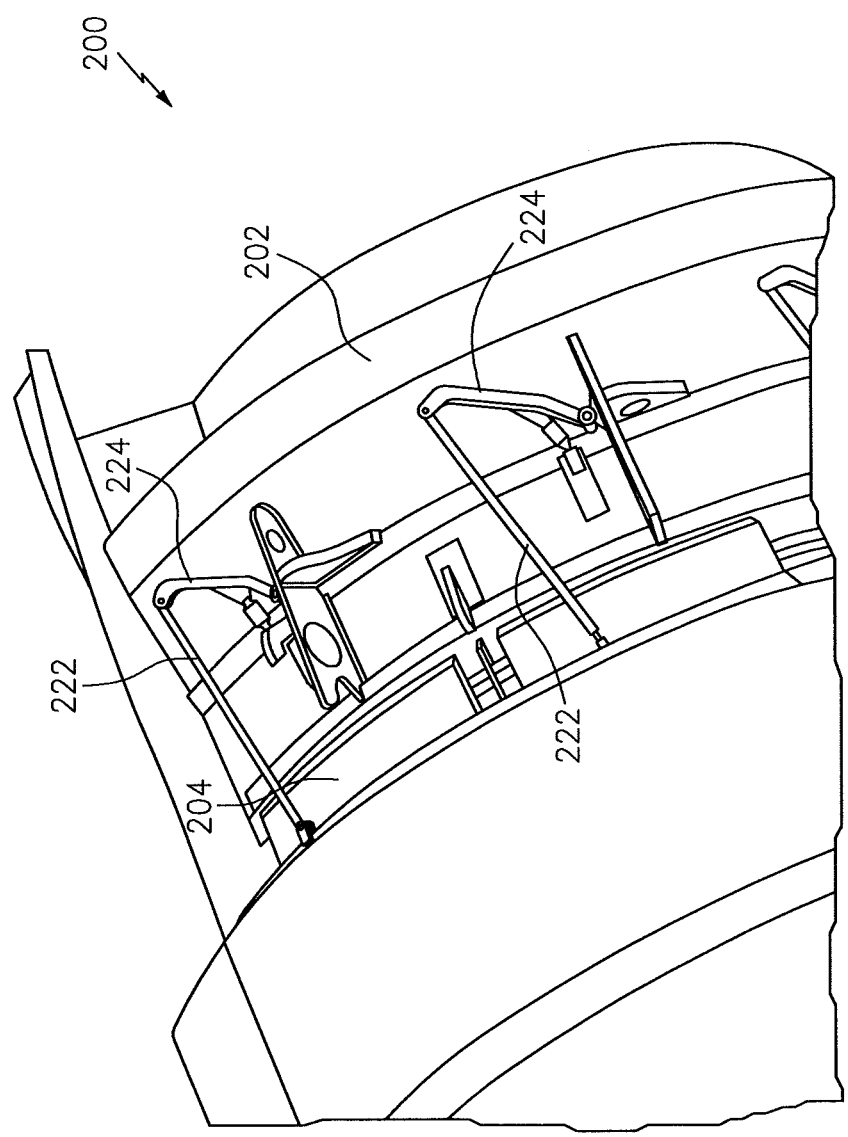
Figure 3C:
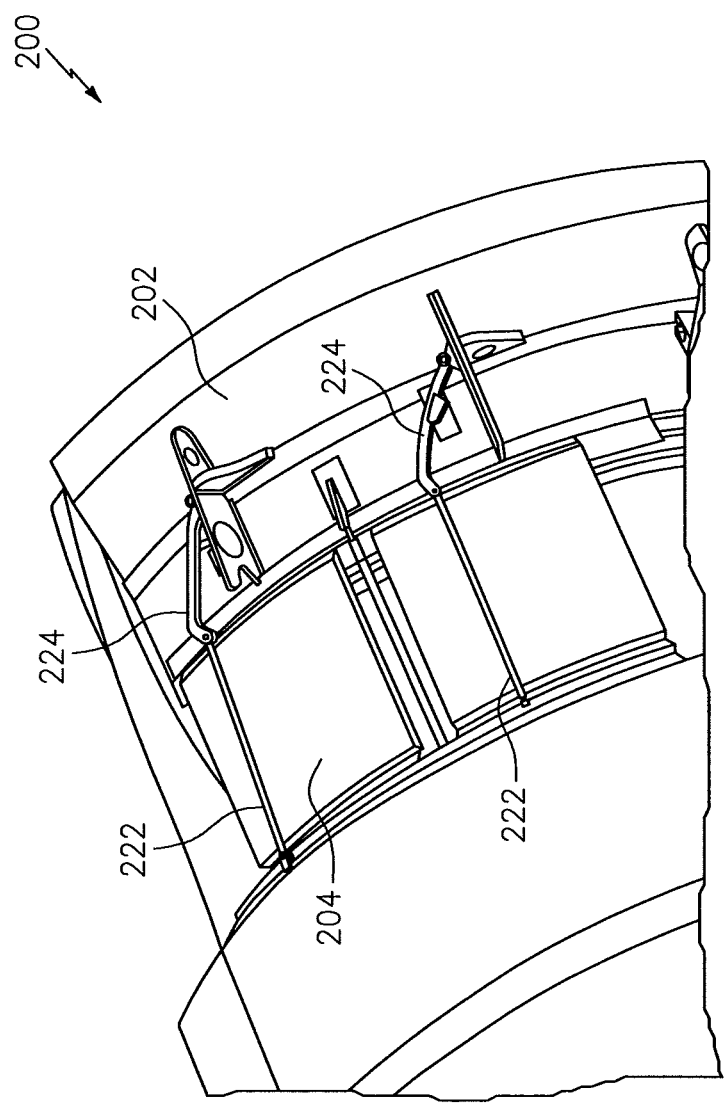

FIGS. 3B-3C illustrate the system 200 in different states, based on a pivoting or turning of the first crank 224 as a result of sleeve 202 being driven aft. As shown in FIGS. 3B-3C, the degree to which a cascade 204 is exposed may be based on the translation of sleeve 202. The cascades may be rigidly attached to a forward edge of or part of the translating sleeve 202, the translation of the sleeve aftward exposing the cascades 204 by pulling them out from underneath the fan cowl. Alternatively, in another embodiment the cascades may be attached to the fixed structure 206 and would not then translate along with the sleeve 202. As the sleeve moves aftward, the pushrod 222 remains fixed on its one end to the fixed structure 206, and thus the second end applies a force to rotate first crank 224. The progression from FIG. 3A to FIG. 3B and from FIG. 3B to FIG. 3C in terms of translating the sleeve 202 and in turn pivoting of the first crank 224 demonstrates a change in the thrust reverser from a stowed state (FIG. 3A), to a partially deployed (e.g., 50% deployed) state (FIG. 3B), to a deployed state (FIG. 3C).

Figure 4A:
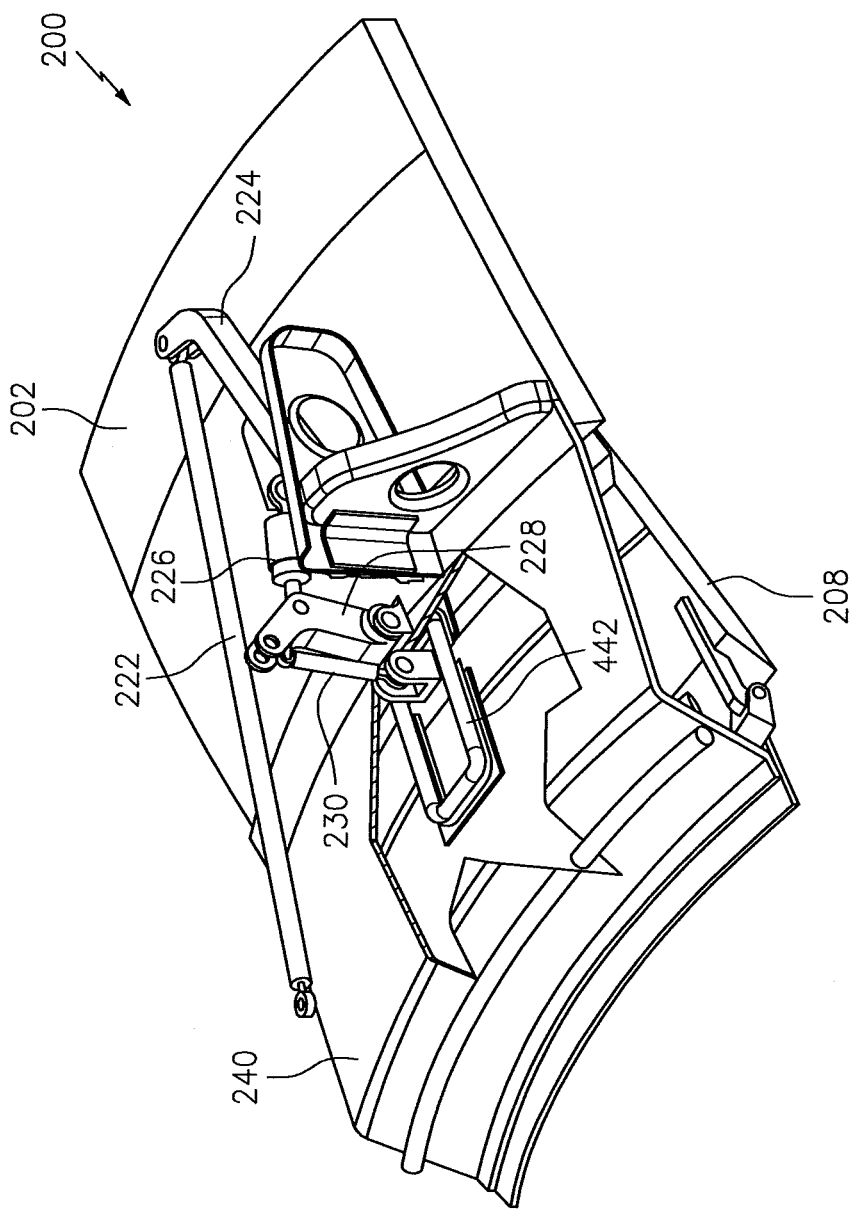
FIGS. 4A-4C illustrate the system of FIG. 2, and in particular, various states/positions of a second crank based on a radial motion of the second crank in relation to a deployment of a blocker door.
Figure 4B:
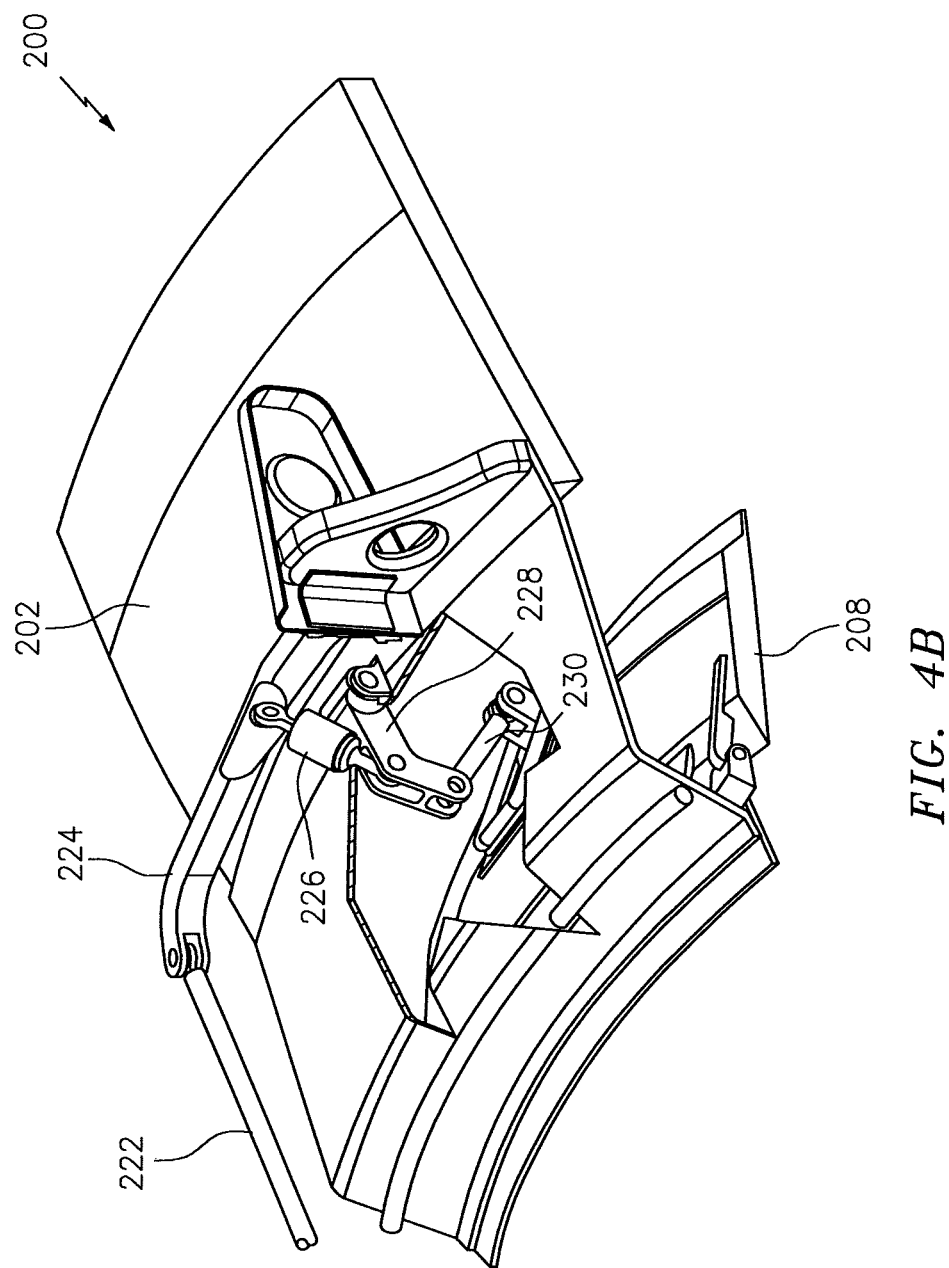
Figure 4C:
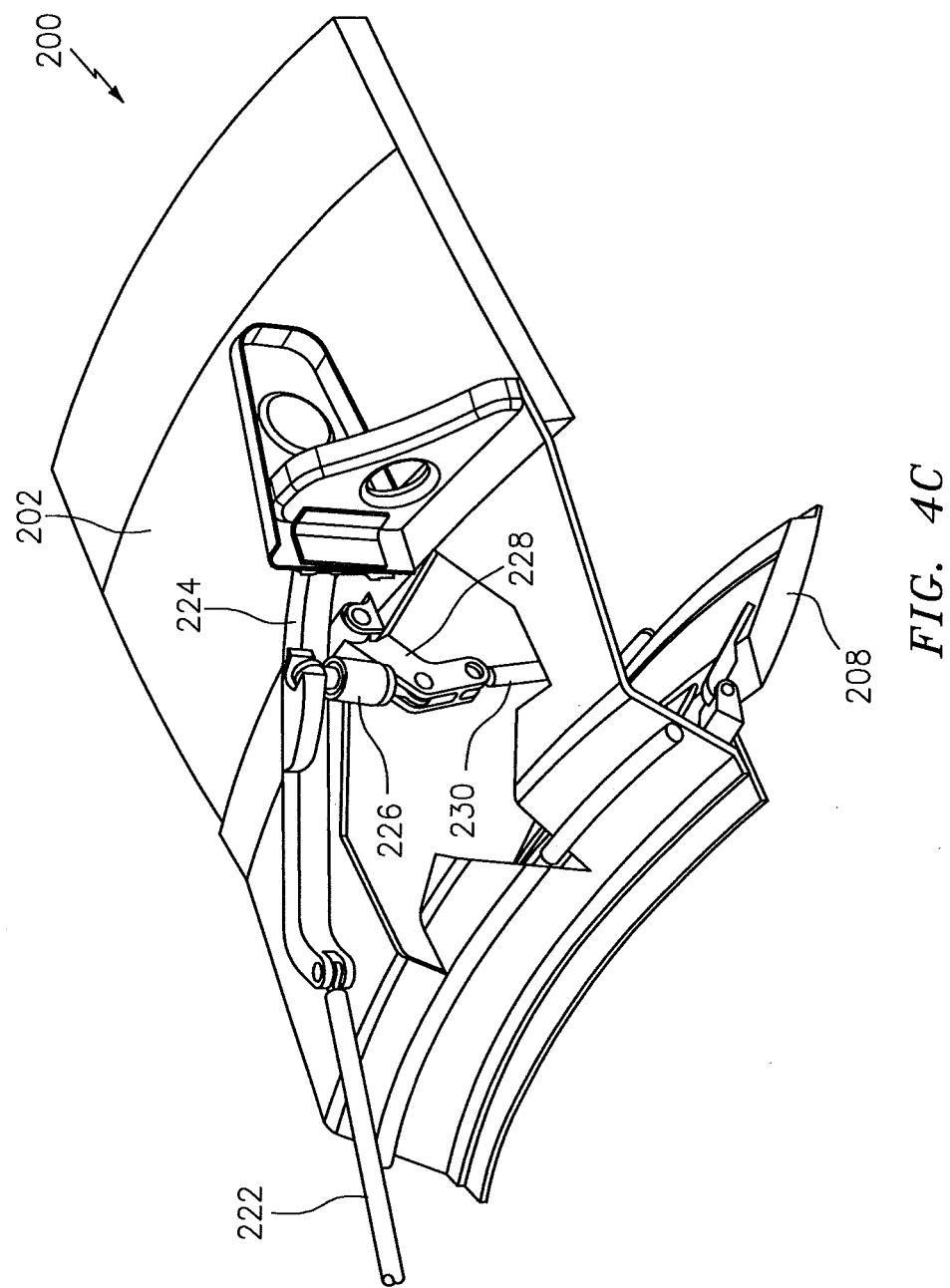
Figure 5:
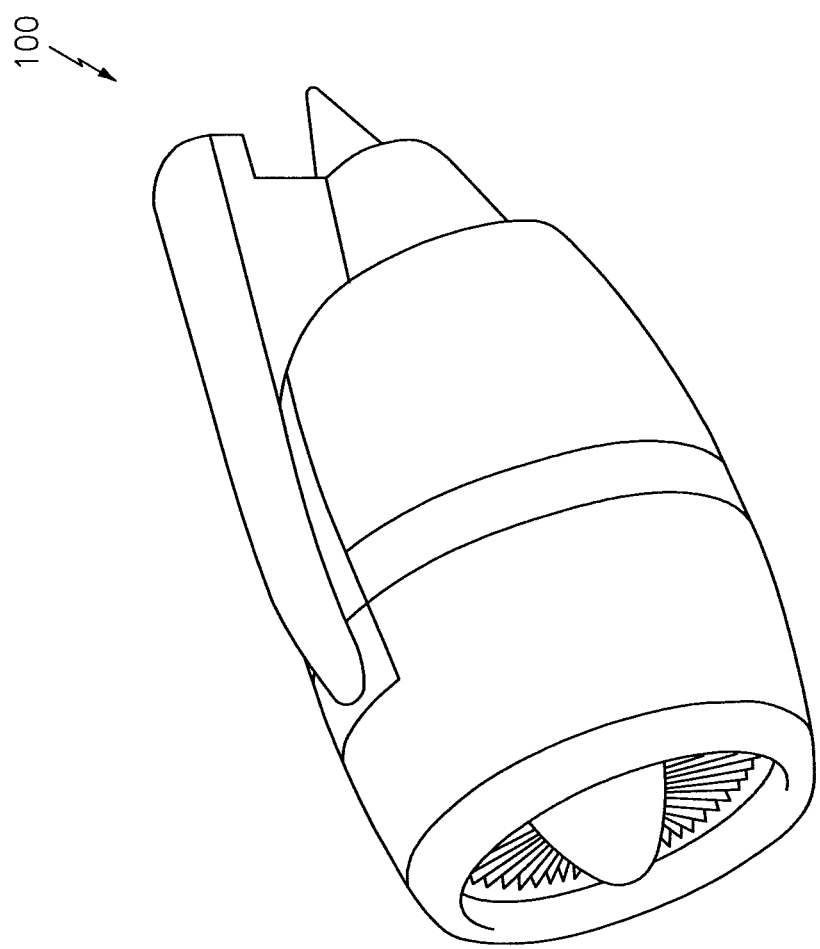
FIG. 5 illustrates a turbofan propulsion system with a nacelle incorporating a thrust reverser.

Referring now to FIGS. 4A-4C, another view of the system 200 is shown. FIGS. 4A-4C illustrate a conversion of the motion of first crank 224 which is generally constrained to a tangential plane into the motion of second crank 228 which is generally constrained to a radial plane (again, relative to a central axis of the thrust reverser and the engine). In the progression from FIG. 4A to FIG. 4B and from FIG. 4B to FIG. 4C, the blocker door 208 transitions from a stowed state (FIG. 4A), to a partially deployed state (FIG. 4B), and to a fully deployed state (FIG. 4C), coinciding with a transition of the thrust reverser from a stowed state to a deployed state. When operating in the stowed state/mode, the blocker door links 230 may be hidden because the links 230 are not in the air stream inside the bypass duct and/or are not exposed to any air flowing in the duct.

The first four-bar mechanism, constituting the first pushrod 222, the first crank 224, the fixed structure 206 and the sleeve 202, is generally constrained to move in a plane substantially tangential to the thrust reverser centerline, while the third four bar mechanism, constituting the second crank 202, the third pushrod 230, the door 208 and the sleeve 202' is generally constrained to move in a plane substantially radial with the thrust reverser centerline. The pushrod 226 moves three dimensionally to tie together the two motions, and it is connected with swiveling joints to each of the first crank 224 and second crank 228. The door 208 swings relative to the sleeve 202 generally in the radial direction toward the engine centerline when it deploys. Rather than pushrod 226, it may also be possible to tie together the motion of the first and second cranks 224, 228 with a set of bevel gears attached to each.

As shown in FIG. 4A, the second crank 228 and the third pushrod 230 may reside above the pressure shelf/shell 240

(and the door 208 may reside below the pressure shelf/shell 240) when the thrust reverser is operating in the stowed state. As shown in FIG. 2 and FIG. 4C, at least a portion of the third pushrod 230 and possibly also a portion of the second crank 228 reside below the pressure shelf/shell 240 (and, again, the door 208 may reside below the pressure shelf/shell 240) when the thrust reverser is operating in the deployed state. In order to accommodate the penetration of the third pushrod 230 through the pressure shelf/shell 240, a seal 442 may be included as shown in FIG. 2 and FIG. 4A. The seal 442 may be used to maintain a differential pressure between the duct associated with the sleeve 202 and the ambient environment located outside of, or external to, the duct when, e.g., the thrust reverser is operated in the stowed state. As one of skill in the art would appreciate, the pressure shelf/shell 240 may act to seal off any leakage of a fan air stream through openings and/or provide hoop strength and bending stiffness to one or more translating cowls.

At least a portion of a kinematic mechanism (e.g., a portion of one or more of the four-bar mechanisms described above or one or more gearboxes (e.g., bevel gears)) for actuating (e.g., stowing or deploying) the door 208 may reside above the pressure shelf 240, whereas the door 208 may reside below the pressure shelf in proximity to the duct of the thrust reverser. The door 208 may be configured to be deployed in a substantially radial direction towards a center of the thrust reverser system, and the kinematic mechanism may be configured to convert a substantially tangential motion (e.g., a motion associated with the first crank(s) 224) associated with the actuation to a substantially radial motion associated with the deployment.

Technical effects and benefits of the disclosure include obtaining a maximum/increased efficiency in terms of engine operation/output by minimizing/reducing drag losses. Additionally, the size/profile of one or more components/devices (e.g., a translating sleeve) may be minimized/reduced, allowing for shorter lines of travel and better/different packaging options.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A system for a thrust reverser of an aircraft comprising:
a blocker door;
a kinematic mechanism configured to actuate the blocker door;
a pressure shelf,
wherein the blocker door is configured to reside below the pressure shelf in proximity to a duct of the thrust reverser, and
wherein at least a first portion of the kinematic mechanism is configured to reside above the pressure shelf; and
a seal associated with the pressure shelf is configured to seal around a penetration formed through the pressure shelf through which a second portion of the kinematic mechanism is positioned, the seal maintaining a differential pressure between the duct and an ambient environment located external to the duct.

2. The system of claim 1, wherein the blocker door is configured to be deployed in a substantially radial direction towards a central axis, and wherein the kinematic mechanism is configured to convert a substantially tangential motion associated with the actuation to a substantially radial motion associated with the deployment.

3. The system of claim 1, wherein the kinematic mechanism comprises a gearbox, and wherein the gearbox comprises bevel gears.

4. The system of claim 1, wherein the kinematic mechanism comprises a plurality of four-bar mechanisms arranged in series.

5. The system of claim 1, further comprising:
a fixed structure;
wherein the kinematic mechanism comprises at least a first crank that pivots in a first plane and a second crank that pivots in a second plane normal to the first plane; and
wherein the first crank and the second crank are each configured to move relative to the blocker door.

6. The system of claim 5, wherein the kinematic mechanism comprises a first four-bar mechanism, and the first four-bar mechanism comprises:
the fixed structure;
a first pushrod coupled to the fixed structure;
the first crank coupled to the first pushrod; and
a translating sleeve coupled to the first crank and configured to translate along an axis,
wherein the first crank is pivotally attached to the translating sleeve.

7. The system of claim 6, further comprising at least one cascade configured to be selectively hidden or exposed based on a degree to which the translating sleeve is translated along the axis.

8. The system of claim 6, wherein the kinematic mechanism further comprises a second four-bar mechanism, the second four-bar mechanism comprising:
the first crank;
the translating sleeve;
a second pushrod coupled to the first crank; and
the second crank coupled to the second pushrod.

9. The system of claim 8, wherein the system is configured to convert a tangential motion associated with the first crank to a radial motion associated with the second crank.

10. The system of claim 8, wherein the kinematic mechanism further comprises a third four-bar mechanism, the third four-bar mechanism comprising:
the translating sleeve;
the second crank;
a third pushrod coupled to the second crank; and
the blocker door coupled to the third pushrod.

11. The system of claim 10, further comprising: wherein at least a portion of the third pushrod is configured to selectively penetrate the pressure shelf based on whether the thrust reverser is operated in a stowed state or a deployed state.

12. The system of claim 5, further comprising a linkage coupled between the second crank and the blocker door, wherein the second crank is pivotally connected to the linkage.

13. A system for an aircraft propulsion system, comprising:
a fixed structure of a thrust reverser;
a blocker door;
a plurality of mechanisms arranged in series with one another to couple the fixed structure and the blocker door, the plurality of mechanisms comprising a first crank and a second crank, the first crank pivotable in a first plane, and the second crank pivotable in a second plane which is normal to the first plane;

a pressure shelf configured to translate along an axis of the aircraft propulsion system, wherein the blocker door is configured to reside below the pressure shelf in proximity to a duct of the thrust reverser, and wherein at least a portion of the second crank is configured to reside above the pressure shelf;

a translating sleeve configured to translate along the axis; and at least one cascade configured to be selectively covered or uncovered as the translating sleeve translates along the axis;

wherein the pressure shelf is connected to and translates with the translating sleeve.

14. The system of claim 13, wherein the first crank and the second crank are each configured to move relative to the blocker door.

15. The system of claim 13, wherein the at least one cascade comprises a plurality of cascades configured to be selectively covered or uncovered as the translating sleeve translates along the axis.

\* \* \* \* \*